United States Patent [19]
Ziu

[11] Patent Number: 6,086,114
[45] Date of Patent: Jul. 11, 2000

[54] DOUBLE-CONTAINMENT PIPE ASSEMBLY WITH CONICAL-SHAPED INTERNAL ANCHOR

[76] Inventor: Christopher G. Ziu, 7 Douglas St., Merrimack, N.H. 03054

[21] Appl. No.: 09/081,758

[22] Filed: May 20, 1998

[51] Int. Cl.⁷ .......................................... F16L 3/08
[52] U.S. Cl. ................. 285/123.16; 285/123.17; 285/133.1; 285/179; 285/419; 138/113
[58] Field of Search ..................... 138/113, 114, 138/112; 285/123.1, 123.15, FOR 113, FOR 120, 123.16, 123.17, 179, 132.1, 419

[56] References Cited

U.S. PATENT DOCUMENTS

| | | | |
|---|---|---|---|
| 2,938,569 | 5/1960 | Goodrich | 138/113 X |
| 3,226,135 | 12/1965 | Epstein | 285/123.16 X |
| 3,648,734 | 3/1972 | Waite et al. | 138/113 |
| 3,865,145 | 2/1975 | McKay et al. | 138/113 |
| 4,033,381 | 7/1977 | Newman et al. | 138/113 |
| 4,098,476 | 7/1978 | Jutte et al. | 138/113 X |

*Primary Examiner*—Dave W. Arola
*Attorney, Agent, or Firm*—Cummings & Lockwood

[57] ABSTRACT

An anchor support is provided for a double-containment piping assembly having at least one outer piping component defining a first diameter, and at least one inner piping component received within the at least one outer piping component and defining a second diameter less than the first diameter and forming an approximately annular space between the inner and outer piping components. The anchor support has a cylindrical outer-component support section defining a first approximately annular support surface having a first diameter approximately equal to the first diameter of the at least one outer piping component for contacting and supporting the outer piping component. An approximately cylindrical inner-component support section of the anchor support is spaced laterally relative to, and located approximately at an opposite end of the anchor support relative to the outer-component support section. The inner-component support section defines a second approximately annular support surface having a second diameter which is less than the first diameter and approximately equal to the second diameter of the inner piping component for anchoring and supporting the inner piping component within the outer piping component. A tapered connecting section of the anchor support defines a conical-tapered surface extending between the outer-component support section and the inner-component support section and tapering inwardly from one end adjacent to the outer-component support section to another end adjacent to the inner-component support section.

36 Claims, 9 Drawing Sheets

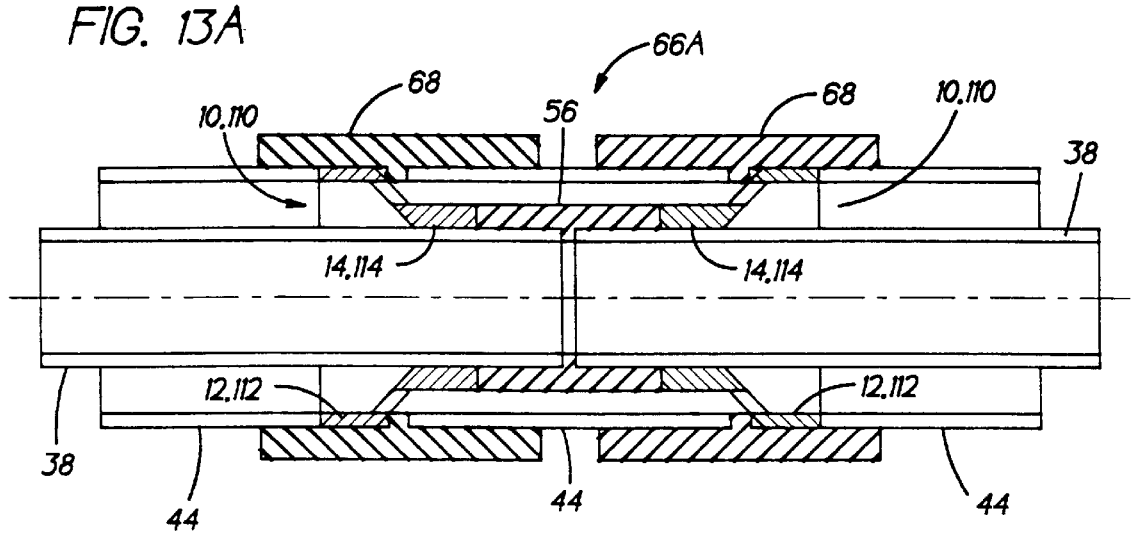
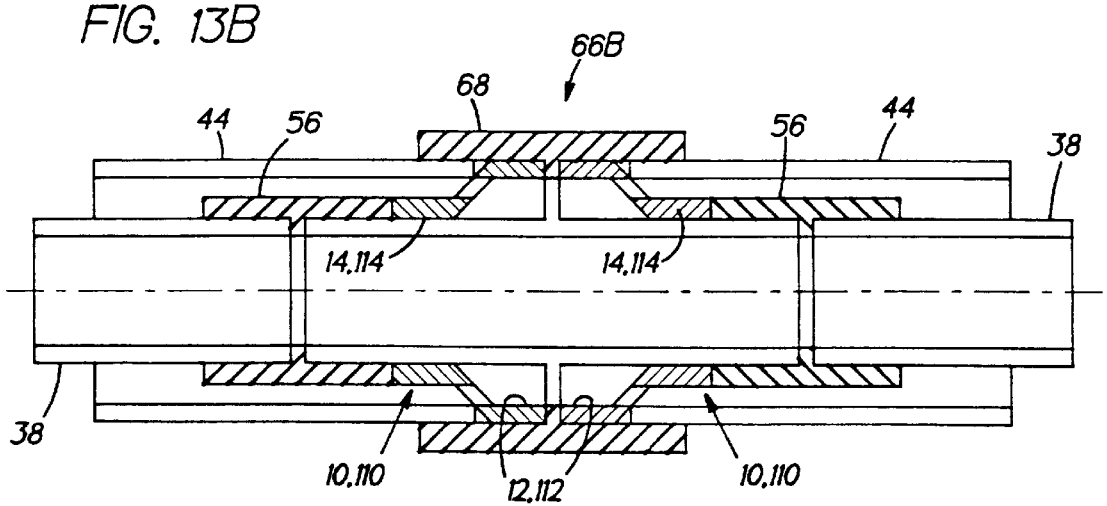

DOUBLE-CONTAINMENT PIPE ASSEMBLY WITH CONICAL-SHAPED INTERNAL ANCHOR

FIELD OF THE INVENTION

The present invention relates to double-containment pipe assemblies having inner, primary or carrier pipes or components located within outer, secondary or containment pipes or components, and more particularly, to internal anchors for supporting and anchoring the inner pipes or components within the outer pipes or components.

BACKGROUND INFORMATION

Hazardous fluids are routinely conveyed within enclosed pipes or conduits. Recognizing that such pipes and conduits can leak due to any of numerous causes, such as manufacturing defects, excessive pressure, corrosion, joint defects, and other defects created by thermal stresses, double-containment piping systems have been developed in which an inner pipe system (also referred to as the "carrier" or "primary" pipe system) is located within an outer pipe system (also referred to as the "containment" or "secondary" pipe system). An axially-extending space, typically in the form of an annulus, is defined between the inner and outer pipe systems for receiving and containing any fluids that might leak from the inner or carrier piping components. The inner pipes are typically supported by either resting on a lower, inside wall of the outer pipes, or alternatively, by intermediate supports mounted between the inner pipes and the outer pipes for supporting the inner pipes in spaced relation to the outer pipes and thereby forming an annulus between the inner and outer pipes.

Intermediate supports are typically designed to permit axial movement, but tend to constrain lateral movement of the inner pipes relative to the outer pipes in order to maintain the inner and outer pipes in an approximately coaxial relationship (these types of supports have been referred to as "centering supports"). However, other types of intermediate supports are designed to permit both axial and lateral movement of the inner pipes relative to the outer pipes in order to accommodate differential thermal expansion. Exemplary prior art intermediate supports for double-containment pipe systems are illustrated in U.S. Pat. Nos. 5,141,184; 5,018,260; 4,751,945; 3,863,679; and U.S. Pat. No. 3,417,785. Double-containment pipe fittings, such as elbow fittings, tee fittings, lateral and/or reducing fittings, tee-wye branch fittings, etc., may be also provided with supports for centralizing, and often anchoring the inner pipes connected to the fittings. Exemplary prior art fitting and anchor support assemblies of this type are shown in U.S. Pat. Nos. 4,886,305; 5,186,502; and 5,398,973.

For double-containment pipe systems subject to relatively moderate differential thermal expansion, the problem has been addressed in the prior art by employing the above-described fitting and anchor support assemblies with intermediate centering supports spaced relative to each other between the anchor supports. In these types of systems, the outer or containment pipes are typically anchored within the soil in underground installations, and otherwise are anchored with suitable supports in aboveground installations. Thus, the above-described fitting and anchor support assemblies restrain and substantially prevent any axial expansion of the carrier pipes, and the intermediate supports are designed and positioned to prevent buckling of the carrier pipes between the fitting and anchor support assemblies. Since any thermal expansion is restrained, the inner pipes or carrier components are subjected to compressive stress. If the magnitude of this stress, and the resulting strain within the system is held within specified limits, then this type of arrangement can effectively control and compensate for any thermal expansion of the carrier pipe system. This type of arrangement is particularly effective for controlling thermal expansion in double-containment pipe systems employing materials that do not perform well in bending, such as certain types of piping made of reinforced thermo-setting resin that employ adhesively-bonded joints, and piping made of certain types of thermoplastics that employ solvent-cemented joints. In these types of systems, the magnitude of bending that may occur in a flexible system can cause a failure, typically at a joint, and therefore a restrained system is often a better choice.

One of the drawbacks of the prior art fitting and anchor support assemblies is that they typically must be joined to the respective carrier and containment pipes and other components by adhesive bonding (in RTRP or thermoplastic systems), solvent cementing (in thermoplastic systems), hot gas welding (in thermoplastic systems), or welding (in metallic systems). The welding/bonding processes, which are often difficult to perform due to the complexities of the assemblies, can require substantial construction and assembly time and thus involve substantial costs. The welding/bonding processes also typically require that the supports be made of the same material as either the inner and/or the outer pipes so that they can be properly welded or bonded to the respective pipes. Accordingly, any flexibility in selecting the materials of the anchor supports is typically limited by the materials of the inner and/or outer pipes.

In addition, the configurations of the prior art fitting and anchor support assemblies typically require a different geometry depending upon the type of fitting to be joined (e.g., 90° elbow, 45° elbow, tee, lateral, etc.). Furthermore, the prior art designs typically require a different internal anchor design for each given pipe size, thereby increasing the number of parts required on hand and the overall costs of the double-containment pipe systems.

Accordingly, it is an object of the present invention to provide anchor supports for double-containment pipe assemblies which overcome one or more of the drawbacks and disadvantages of the prior art.

SUMMARY OF THE INVENTION

The present invention is directed to support for a double-containment pipe assembly. The double-containment pipe assembly includes at least one outer piping component defining a first diameter, and at least one inner piping component received within the at least one outer piping component and defining a second diameter less than the first diameter and forming an approximately annular space between the inner and outer piping components. The anchor support comprises an outer-component support section including a first approximately annular support surface defined at least in part by a first diameter approximately equal to the first diameter of the at least one outer piping component for anchoring and supporting the outer piping component. An inner-component support section of the anchor support is spaced laterally relative to, and located approximately at an opposite end of the anchor support relative to the outer-component support section. The inner-component support section includes a second approximately annular support surface defined at least in part by a second diameter which is less than the first diameter and approximately equal to the second diameter of the inner piping component for anchoring and supporting the inner piping component within the outer piping component. A tapered connecting section of the anchor support defines a tapered surface extending between the outer-component support section and the inner-component support section and tapering inwardly from approximately the first diameter at one end adjacent to the outer-component support section to approximately the second diameter at another end adjacent to the inner-component support section.

In a preferred embodiment of the invention, the outer-component support section defines an approximately cylindrical shape, the inner-component support section defines an approximately cylindrical shape, and the tapered connecting section defines an approximately conical shape. The outer-component support section is adapted to be received within a socket of, or otherwise may abut or be stacked against, an outer piping component, such as an elbow fitting, branch fitting, or pipe coupling. Similarly, the inner-component support section is adapted to receive an inner pipe or like carrier component, and further is adapted to abut or be stacked against one end of an inner piping component, such as an elbow fitting, branch fitting or pipe coupling, to anchor the inner piping components relative to the outer piping components.

One advantage of the anchor supports of the invention is that they may be assembled with other double-containment components without employing welding or bonding processes as required by the prior art.

Another advantage of the anchor supports of the invention is that they may be made of different materials than the other double-containment components with which they are assembled.

These and other advantages of the invention will become apparent in view of the following detailed description and accompanying drawings.

BRIEF DESCRIPTION OF THE DRAWINGS

FIG. 13A is a cross-sectional view of a mid-line internal anchor assembly employing two anchor supports of the invention coupled between one carrier pipe coupling and two containment pipe couplings.

FIG. 13B is a cross-sectional view of another mid-line internal anchor assembly employing two anchor supports of the invention coupled between two carrier pipe couplings and one containment pipe coupling.

DETAILED DESCRIPTION OF THE PREFERRED EMBODIMENTS

Figure 1:
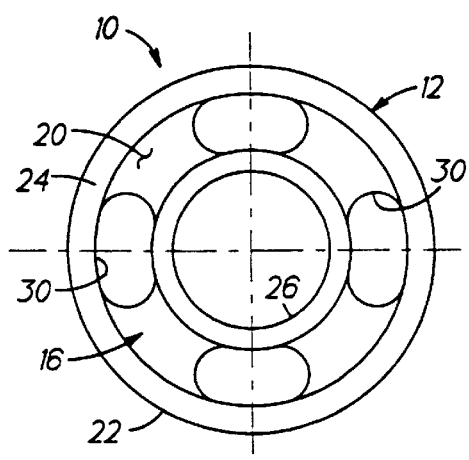
FIG. 1 is an end elevational view of an anchor support embodying the present invention.
Figure 2:
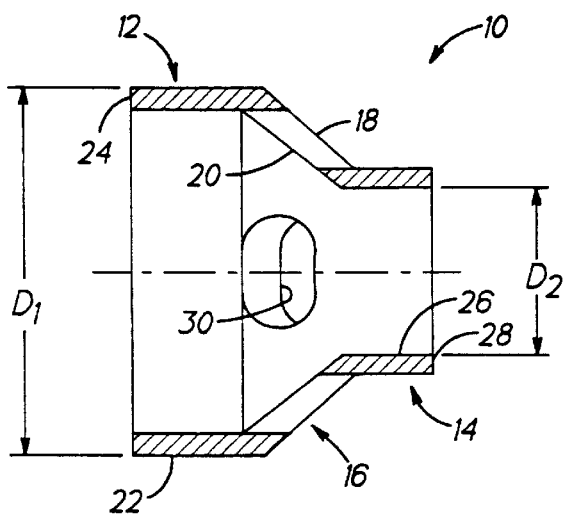
FIG. 2 is a cross-sectional view of the anchor support of FIG. 1.

In FIGS. 1 and 2, an anchor support embodying the present invention is indicated generally by the reference numeral 10. As described in further detail below, the anchor support 10 is designed for use in a double-containment pipe assembly having at least one outer piping component, and at least one inner piping component received within the outer piping component and defining an approximately annular space between the inner and outer components. The term double-containment pipe system or assembly is used herein to describe without limitation any of numerous systems or assemblies wherein inner, primary or carrier pipes and/or other components are contained within outer, secondary or containment pipes and/or other components, and an approximately annular space is formed between the inner and outer piping components for receiving and containing any fluids carried by the inner piping components in the event of a leak. As described in further detail below, the anchor supports of the invention are used to anchor and support the inner pipes or components within the outer pipes or components in substantially restrained double-containment piping systems. Alternatively, the anchor supports of the invention may be employed to limit, direct and/or control thermal expansion towards, for example, elbows and expansion loops in internally flexible double-containment piping systems.

As shown in FIGS. 1 and 2, the anchor support 10 comprises an outer-component support section 12 located at one end of the support for contacting and supporting an outer pipe or containment component. An inner-component support section 14 is spaced laterally relative to, and located approximately at the opposite end of the anchor support relative to the outer-component support section 12 for anchoring and supporting an inner pipe or carrier component within the outer pipe or containment component. A tapered connecting section 16 extends between the outer-component support section 12 and the inner component support section 14, and tapers inwardly from an outer diameter D1 at one end adjacent to the outer-component support section 12, to an inner diameter D2 at the opposite end adjacent to the inner-component support section 14. As shown in FIG. 2, the tapered connecting section 16 defines an outer tapered surface 18, and an inner tapered surface 20 located on the opposite side of, and oriented approximately parallel to the outer tapered surface. As also shown best in FIG. 2, the tapered connecting section 16 tapers inwardly from the outer-component support section to the inner-component support section at an angle of approximately 45° relative to the central axis of the support. However, as will recognized by those skilled in the pertinent art based on the teachings herein, the angle of taper may be selected as desired depending upon the requirements of a particular design or system, or as otherwise desired in order to provide adequate stress transition between the outer and inner component support sections. Accordingly, although a taper angle of 45° is currently preferred, another taper angle within the range of approximately 15° to 75° may be equally sufficient depending upon other characteristics of the double-containment piping system.

The outer-component support section 12 defines one or more annular support surfaces for anchoring and supporting an outer or containment piping component. As shown in 2, a first annular support surface 22 is defined by the first diameter D1 and extends along the external periphery of the outer-component support section 12 in the axial direction thereof, and a second annular support surface 24 extends inwardly from the first annular support surface on the respective end of the support. As described further below, the first annular support surface 22 is typically received within a socket of an outer or containment component, such as an outer elbow or branch fitting, and the diameter D1 is selected to allow the support surface 22 to be slidably received within the socket. The second annular support surface 24, on the other hand, typically abuts or is "stacked" against either an adjacent outer pipe or containment component slidably received within the socket of the carrier or containment fitting, or a containment extension, such as an extension ring, seated between the anchor and the containment component.

The inner-component support section 14 also defines one or more annular support surfaces for anchoring and supporting an inner or carrier piping component. As shown in FIG. 2, a first annular support surface 26 is defined by the second diameter D2 and extends along the internal periphery of the inner-component support section 14 in the axial direction thereof, and a second annular support surface 28 extends outwardly from the first annular support surface on the respective end of the support. As described further below, the diameter D2 is typically selected to allow the first annular support surface 26 to slidably receive an inner or carrier pipe or containment component. The second annular support surface 28, on the other hand, typically abuts or is "stacked" against either an adjacent inner fitting or containment component, such as the end surface of a socket for receiving the inner piping component, or the end surface of a carrier extension, such as an extension ring, seated between the anchor and the socket.

As shown in FIGS. 1 and 2, the tapered connecting section 18 may define a plurality of apertures 30 formed through the support for permitting any fluid (liquid and/or gas) to flow through the support. Although four apertures are shown spaced approximately 90° relative to each other, a different number of apertures, having different shapes and/or spacing relative to each other, may be equally employed. For example, it may be desirable to have only a single aperture located at the 6 o'clock position when the anchor support is mounted within a double-containment assembly in order to permit any fluid to drain through the assembly.

Depending upon the expected loads to be applied to the anchor support, and the resulting stress calculations, it may be necessary for the wall thickness of the outer-component support section 12 to be approximately equal to the wall thickness of the adjacent outer or containment piping component, or to have some other defined relationship with respect to the outer or containment piping component. In addition, it may be desirable for the wall thickness of the inner-component support section 14 to be approximately equal to, or at least closer to the wall thickness of the adjacent inner or carrier piping component. Accordingly, as shown typically in FIG. 2, the outer-component support section 12 may have a different wall thickness than the inner-component support section 14. In the embodiment of FIG. 2, the outer-component support section 12 defines a greater wall thickness than does the inner-component support section 14 since the larger diameter outer piping components will typically define greater wall thicknesses than the smaller diameter inner piping components. Also in the embodiment of FIG. 2, the wall thickness of the tapered connecting section 16 preferably tapers down from a wall thickness approximately equal to that of the outer-component support section 12 at one end, to a wall thickness approximately equal to that of the inner-component support section 14 at the other end. However, as will be recognized by those skilled in the pertinent art based on the teachings herein, it may be unnecessary to vary the wall thicknesses, and therefore the anchor support 10 may define an approximately uniform wall thickness throughout. In addition, if the anchor support is made of a material that is stronger than that of the other piping components (e.g., if the anchor support is made of steel, aluminum, titanium or other metal and is mounted in a thermoplastic double-containment piping system), then the wall thickness(es) of the anchor support may be significantly thinner than those of the corresponding pipes or containment components.

Figure 3:
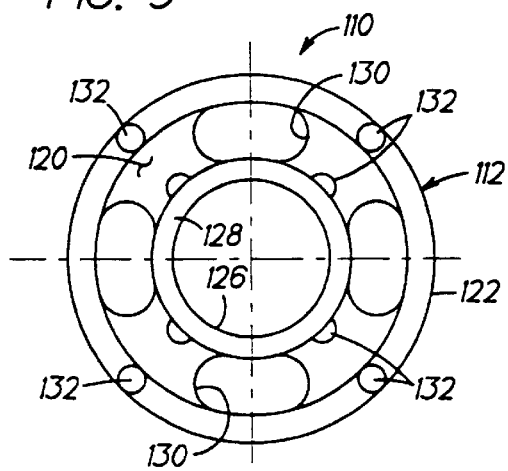
FIG. 3 is an end elevational view of another embodiment of an anchor support of the invention having pilots or like means for interlocking the anchor support with other carrier and/or containment components.
Figure 4:
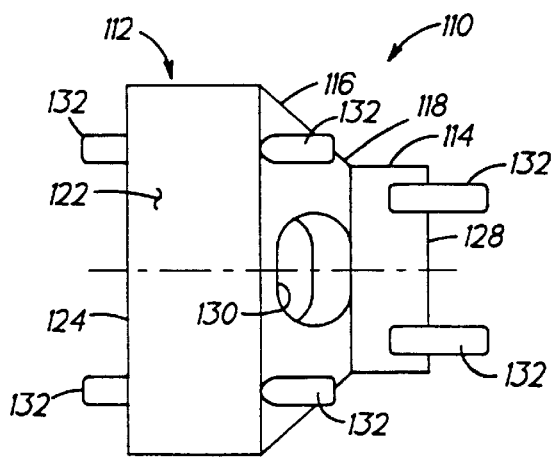
FIG. 4 is a side elevational view of the anchor support of FIG. 3.

In FIGS. 3 and 4, another embodiment of the anchor support of the invention is indicated generally by the reference numeral 110. The anchor support 110 is substantially the same as the anchor support 10 described above with reference to FIGS. 1 and 2, and therefore like reference numerals preceded by the numeral 1 are used to indicate like elements.

The primary difference of the anchor support 110 in comparison to the anchor support 10, is that the anchor support 110 comprises means for interlocking or otherwise aligning the anchor support with one or more other inner and/or outer piping components. In the preferred embodiment of FIGS. 3 and 4, this means includes one or more tabs or like pilots 132 which are dimensioned to be received within corresponding apertures or recesses formed in the adjacent inner and/or outer piping or like components (not shown) to thereby fix the angular position of the anchor support relative to the other components within the double-containment piping system. One advantage of this feature of the invention is that it permits the anchor support, and thus the apertures 130 of the support to be mounted in a predetermined angular position within the double-containment piping system. For example, it is frequently desirable to ensure that one of the apertures 130 is located at the 6 o'clock position when assembled in the double-containment piping system to ensure that any fluid within the annulus is permitted to flow through the support and, if necessary, drain from the system.

As shown in FIGS. 3 and 4, the anchor support 110 includes four pilots 132 equally spaced relative to each other on the annular surface 124 of the outer-component support section 112; four pilots 132 equally spaced relative to each other on the external conical-tapered surface 118 of the connecting section 116; and four pilots 132 equally spaced relative to each other on the external surface of the inner-component support section 114. As shown in FIG. 3, each of the pilots 132 is defined by a raised protuberance having either a cylindrical or semi-cylindrical cross-sectional configuration, and therefore is shaped to be received within a correspondingly-shaped recess or aperture in the adjacent pipe or component. However, as will be recognized by those skilled in the pertinent art based on the teachings herein, the pilots or protuberances 132 may take any of numerous different shapes and/or configurations, may be formed in any of numerous different ways, and any desired number of such protuberances may be employed. For example, it may be desirable to form the pilots on the adjacent inner or outer piping components, and to form the corresponding recesses or apertures for receiving the pilots on the anchor support. Similarly, the pilots may be formed by dowel pins, or other types of pins or interlocking members received on each end within corresponding apertures formed within the anchor support and the adjacent carrier and/or containment components. In each case, the pilots and corresponding recesses or apertures will prevent the adjacent parts from rotating relative to each other to thereby align the anchor support 10, 110, and the aperture(s) 30, 130 of the anchor support within the double-containment piping system.

Figure 6:
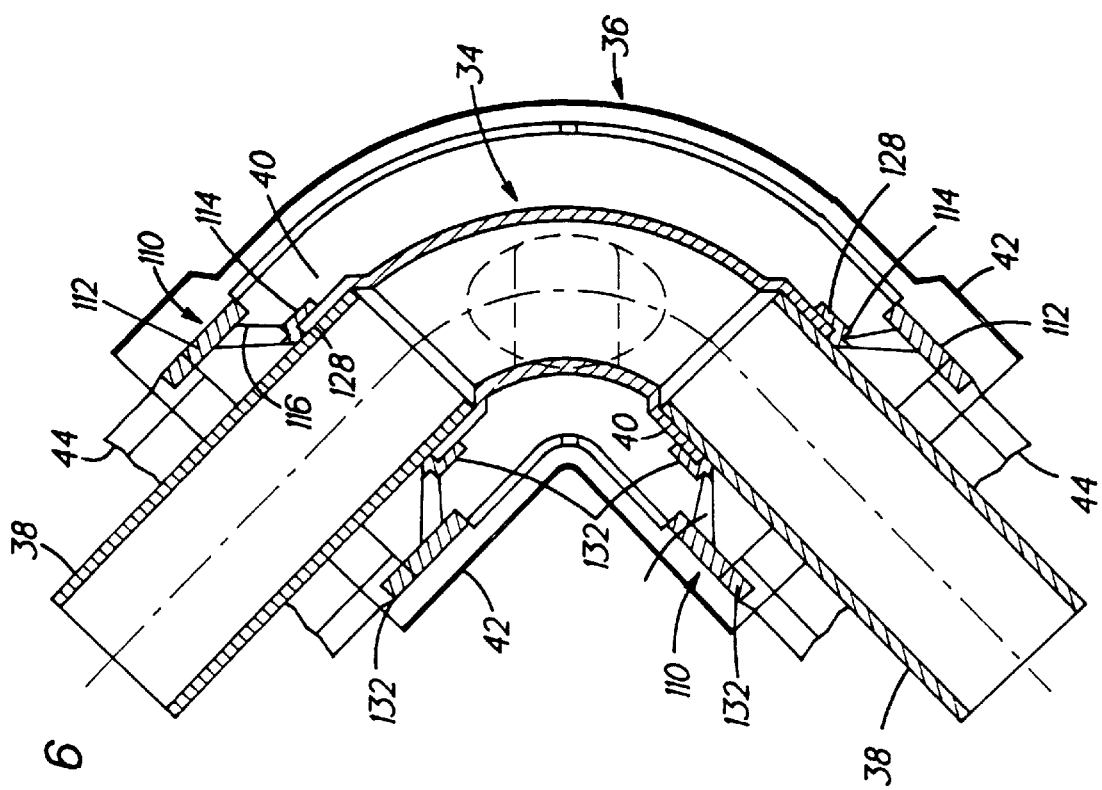
FIG. 6 is a cross-sectional view of the double-containment elbow fitting assembly of FIG. 5.
Figure 5:
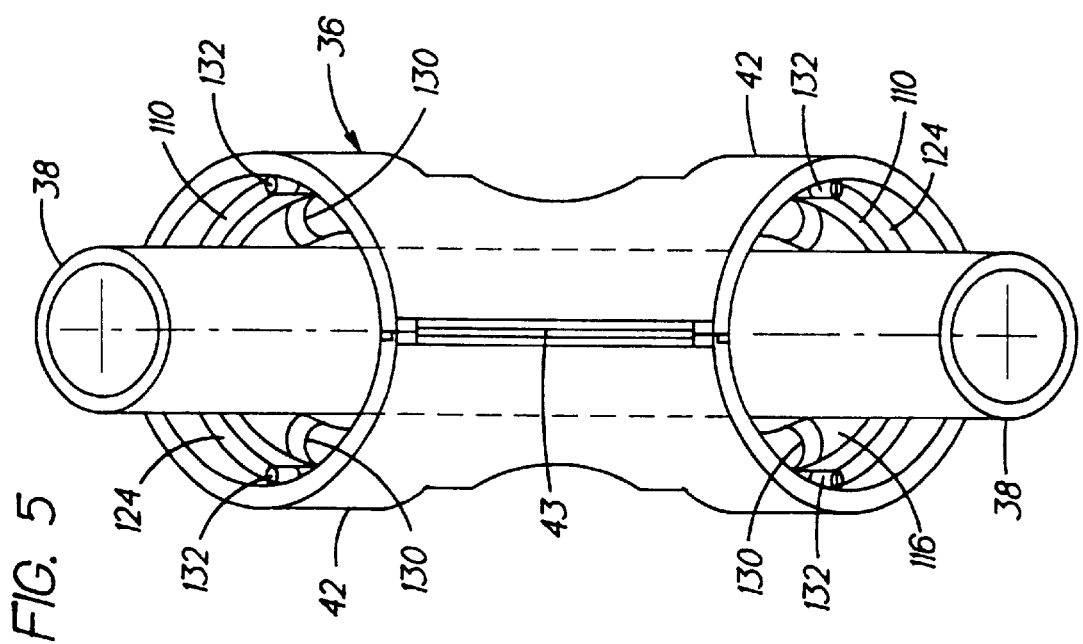
FIG. 5 is a side elevational view of a double-containment elbow fitting assembly employing two anchor supports of the invention at each end of the elbow fitting for anchoring the parts relative to each other.

Turning to FIGS. 5 and 6, two anchor supports 110 of the invention are shown mounted within a 90° elbow fitting for centralizing and supporting a carrier elbow 34 within a containment elbow 36, and for anchoring at least two carrier pipes 38 connected to the carrier elbow. As shown in FIG. 6, one end of each inner pipe 38 is slidably received through an inner-component support section 114 of a respective anchor support 110, and in turn is slidably received within a socket 40 formed on a respective end of the carrier elbow 34. As also shown FIG. 6, the annular surface 128 of each inner-component support section 114 abuts, or is stacked against the adjacent outer surface of the respective inner elbow socket 40. The pilots 132 formed on each inner-component support section 114 of the anchors are received within corresponding apertures formed on the external peripheries of the sockets 40 of the inner elbow fitting 32 to interlock the anchors and inner elbow.

The outer-component support section 112 of each anchor support 110 is slidably received within a respective socket 42 of the containment elbow 36. Two outer or containment pipes 44 are each slidably received within a respective socket 42 of the containment elbow 36 with the ends of the outer pipes abutting or stacked against the respective annular surfaces 124 of the outer-component support sections 112. As shown typically in FIG. 6, pilots 132 may be formed on the outer-component support sections 112 and received within corresponding apertures formed within the annular end faces of the outer pipes 44 to interlock the outer pipes and anchor supports. However, since the pilots 132 of the inner-component support sections 114 are interlocked with the carrier fitting, it may be deemed unnecessary to interlock the outer-component support sections with the adjacent containment components. Similarly, if the pilots of the outer-component support sections are interlocked with the adjacent containment components, it may be deemed unnecessary to interlock the inner-component support sections with the carrier fitting. In addition, if one or more pilots formed on the tapered connecting sections are interlocked with adjacent containment components, then it may be deemed unnecessary to include any other pilots. Thus, if a conservative approach is desired, both the carrier and containment pilots 132 of FIGS. 3 and 4 may be used. Alternatively, a lesser number of pilots may be used to interlock each anchor support with at least one of the adjacent carrier and containment components. One advantage of forming the pilots with separate dowel pins or like interlocking members as described above, is that the anchor supports and adjacent containment or carrier components may be provided with apertures to receive any number of pilots. However, the pilots need only be installed where desired. Thus, a single type of anchor support may be used with any desired number of pilots by simply inserting the dowel pins where desired.

As can be seen, the two anchor supports 110 centralize and support both the carrier elbow 34 within the containment elbow 36, and the carrier pipes 38 within the containment pipes 44. Once the containment pipes 44 are stacked against the outer-component support sections 112 within the outer elbow sockets 42, the inner and outer elbow fittings and inner pipes are anchored in place. In addition, if the fittings (not shown) at the other ends of the inner and outer pipes 38 and 44, respectively, are similarly anchored with additional anchor supports 10 or 110, the pipes extending between the anchored fittings will become anchored as well. As shown typically in FIG. 5, the outer elbow fitting 36 may take the form of a two-piece closure fitting defining axially-extending seams 43 on opposite sides of the fitting (only one shown) forming lines of joinder for connecting the two halves of the fitting together and thereby enclosing the double-containment assembly. The seams 43 may be joined together in any of numerous different ways known to those of ordinary skill in the pertinent art, such as by electro-fusion, adhesive bonding, hot gas welding, or mechanical fasteners.

One advantage of the present invention is that the anchor supports may be installed without welding, bonding, fusing, cementing or otherwise attaching or fastening the anchor supports to the fittings or to the inner and outer pipes. Rather, the anchor supports are locked in place by stacking one end of each anchor between the adjacent carrier fitting and pipe, and by stacking the other end of each anchor between the adjacent containment fitting and pipe. As a result, the entire assembly can be rapidly installed, either by prefabricating the assembly, or by assembling all components in the field. In each case, the parts simply need to be slipped together, without the need for welding, bonding or otherwise attaching or fastening one part to the other.

Another advantage of the anchor supports of the invention is that because they do not have to be bonded, welded, fused, or cemented into a double-containment pipe assembly, they can be made from any desired material without regard to the materials of the other components with which they will be assembled. For example, the anchor supports can be made of aluminum, steel, or other desired metal, and still be used in thermoplastic double-containment piping systems. As a result, the anchor supports can be made with relatively thin wall thicknesses in comparison to the thermoplastic or other double-containment components, with significantly higher strength. In addition, if desired, the metal anchor supports can be coated with a thermoplastic, thermosetting resin, or like coating to increase the corrosion resistance of the support. Thus, the anchor supports of the invention can be made from virtually any material, and can be fabricated in virtually any manner permitted by the selected material. As a result, the anchor supports of the invention may significantly enhance design flexibility with respect to material selection, and may reduce material and installation costs.

Figure 8:
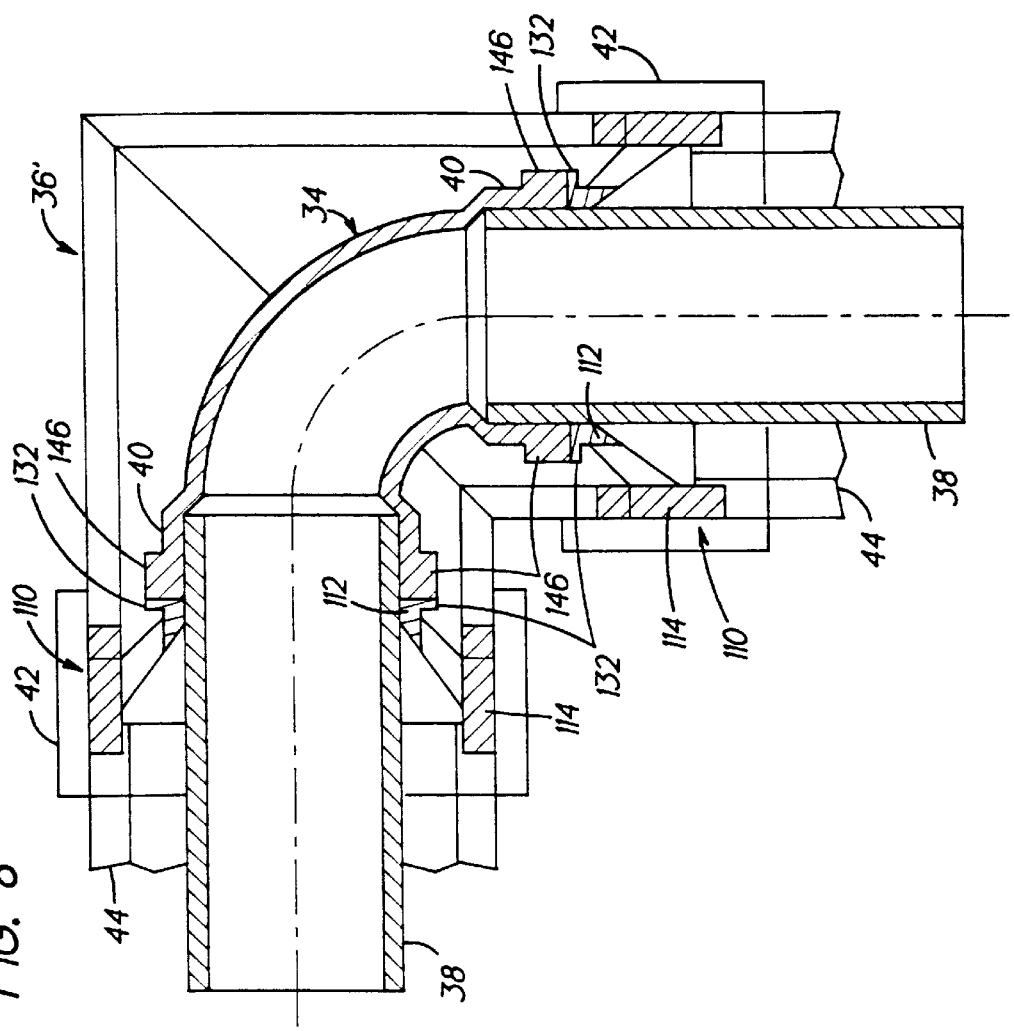
FIG. 8 is a cross-sectional view of the fabricated-type elbow fitting assembly of FIG. 7.
Figure 7:
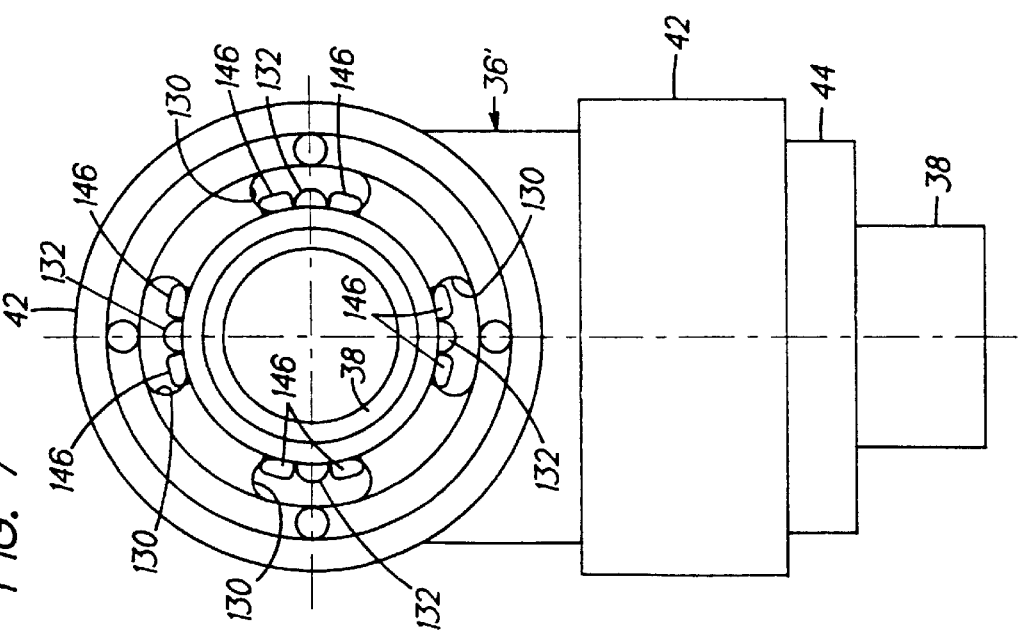
FIG. 7 is an end elevational view of a fabricated-type elbow fitting assembly employing two anchor supports of the invention at the ends of the elbow fitting and illustrating in further detail a preferred means for interlocking the anchor support and inner elbow fitting.

In FIGS. 7 and 8, two anchor supports 110 of the invention are shown mounted within a 90° elbow fitting for centralizing the inner elbow and piping components within the outer elbow and piping components, and for anchoring the components relative to each other. The elbow fitting and anchor assembly of FIGS. 7 and 8 is substantially the same as that of FIGS. 5 and 6, and therefore the same numbers are used to indicate the same or corresponding components. As shown best in FIG. 8, the outer elbow is a fabricated-type elbow, and therefore is indicated generally by the reference numeral 36'. In addition, as shown best in FIG. 8, the carrier elbow 34 defines a plurality of pairs of protuberances 146, wherein the protuberances in each pair are spaced relative to each other to define a groove or recess therebetween. The protuberance pairs 146 are spaced about 90° relative to each other on the outside surface of the socket 40 of the carrier elbow, and therefore each pair is located to receive within its groove or recess a corresponding pilot 132 projecting outwardly from the inner-component support section 112 of the respective anchor 110. Accordingly, the pilots 132 and corresponding protuberance pairs 146 interlock the anchor supports 110 with the carrier elbow 34 to thereby prevent the parts from rotating relative to each other. As also shown typically in FIG. 7, the pilots and corresponding recesses are preferably located to cause one of the apertures 130 to be located at the 6 o'clock position when assembled in the double-containment piping system.

Figure 9:
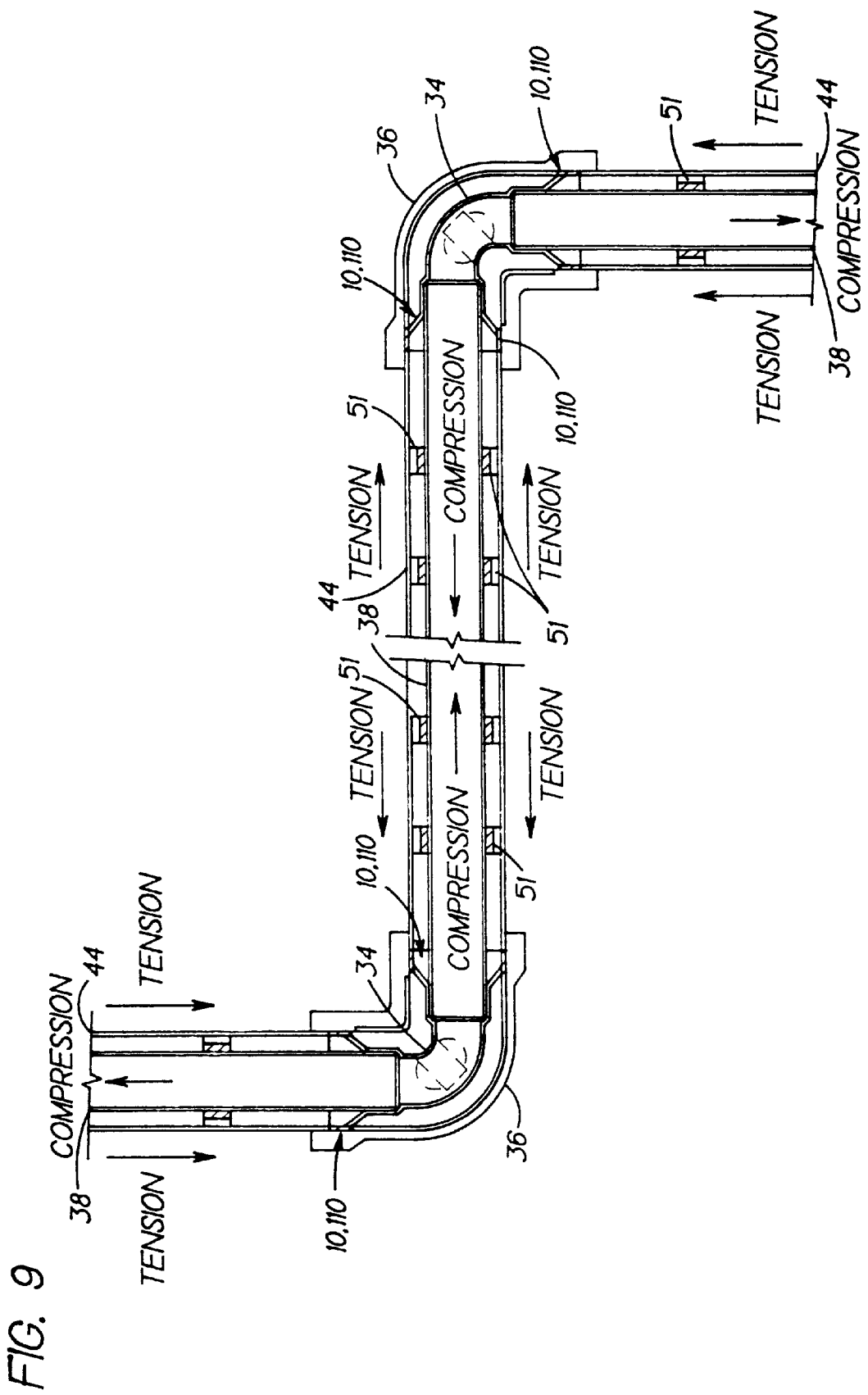
FIG. 9 is a somewhat schematic, cross-sectional view of a double-containment pipe assembly employing two elbow fitting assemblies of the type shown in FIGS. 5 and 6 with straight sections of carrier and containment pipe connected between the elbow fittings, and illustrating schematically the approximate force distribution within the double-containment assembly when the carrier components are subjected to thermal expansion.
Figure 10:
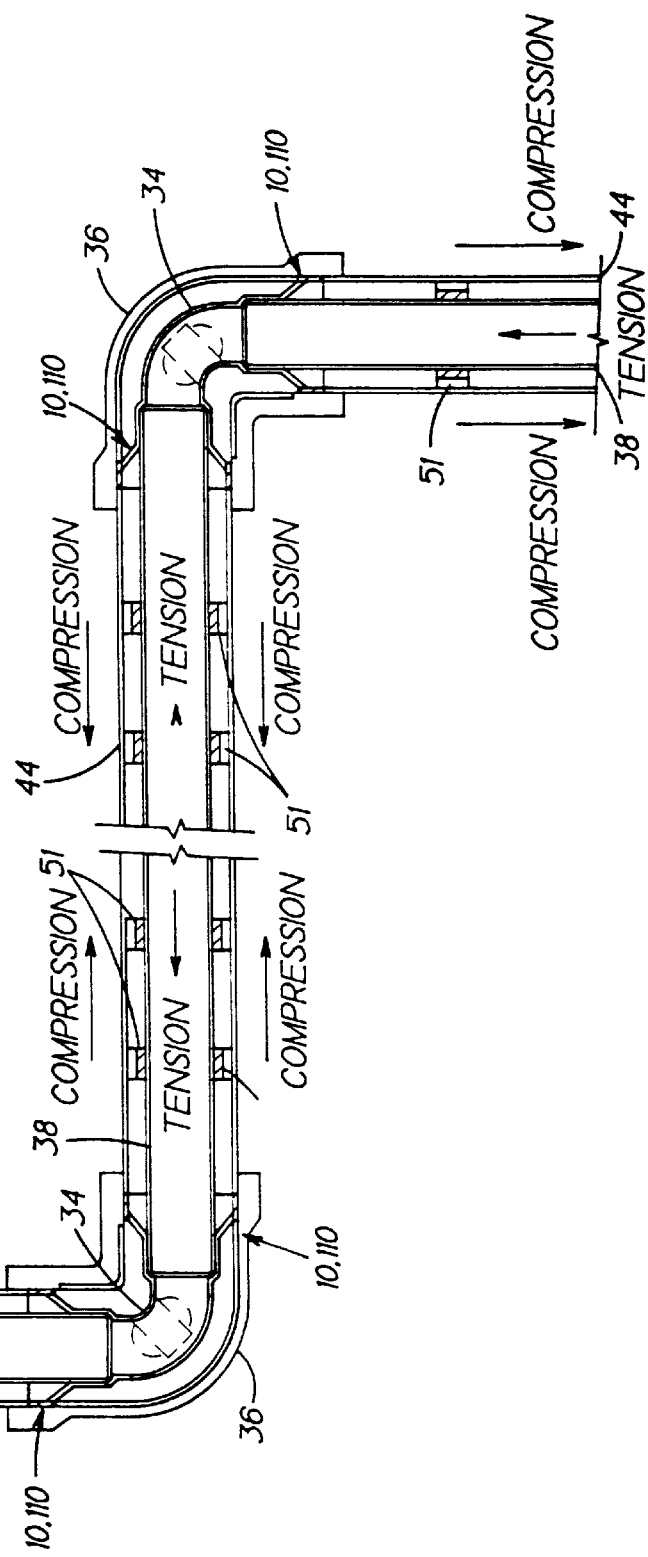
FIG. 10 is another somewhat schematic, cross-sectional view of the double-containment assembly of FIG. 9 and illustrating schematically the approximate force distribution within the double-containment assembly when the carrier components are subjected to thermal contraction.

In FIGS. 9 and 10, the anchor supports 10, 110 of the invention are shown mounted within a double-containment piping assembly comprising two 90° elbow fittings with sections of straight containment and carrier pipes 44 and 38, respectively, connected with the anchors at the ends of the elbow fittings. As can be seen, each of the elbow fitting and anchor support assemblies are constructed in the same manner as described above in connection with FIGS. 5–8. In addition, a plurality of centering and/or axial-guiding supports 51 are mounted at predetermined spacings relative to each other between the inner and outer sections of pipe 38 and 44 to center, and axially guide the containment within the carrier pipes. The centering or axial-guiding supports 51 may be any of numerous supports known to those of ordinary skill in the pertinent art, and the predetermined spacings between the supports may be set in accordance with the teachings of U.S. Pat. No. 5,482,088, which is hereby expressly incorporated by reference as part of the present disclosure.

The arrows in FIG. 9 show the approximate force distribution within the double-containment pipe assembly when the carrier components undergo thermal expansion, which may be caused, for example, when the carrier pipes contain a relatively warm fluid. As can be seen, the anchors substantially prevent axial or longitudinal movement of the straight sections of pipe connected between them. As a result, and as indicated by the arrows in FIG. 9, when the carrier components expand, compressive forces are created within the carrier components and tensile forces are created within the containment components. The stresses are substantially equal and opposite, and therefore when the carrier system is in axial compression, the containment system is subjected to a substantially equal degree of axial tension.

The arrows in FIG. 10, on the other hand, show the approximate force distribution within the double-containment pipe assembly when the carrier components undergo thermal contraction, which may be caused, for example, when the carrier pipes contain a relatively cool fluid. As can be seen, the anchors substantially prevent axial or longitudinal movement of the straight sections of pipe connected between them. As a result, and as indicated by the arrows in FIG. 10, when the carrier components contract, tensile forces are created within the carrier components and compressive forces are created within the containment components. When the carrier system is in axial tension, the containment system is subjected to an approximately equal amount of compressive stress. In either case, the anchors of the invention substantially prevent any axial or longitudinal movement of the inner and outer components relative to each other.

Figure 11:
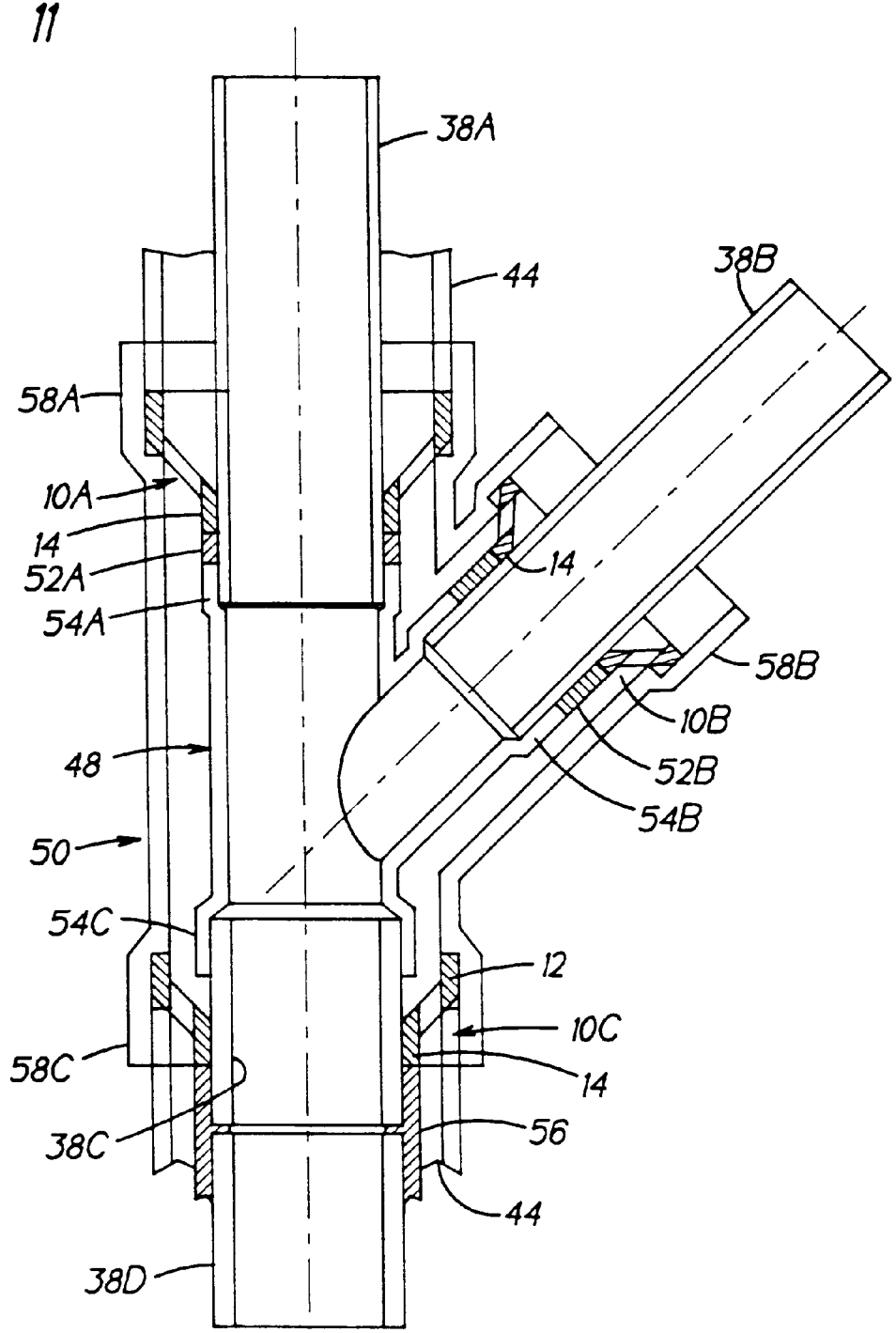
FIG. 11 is a cross-sectional view of a lateral branch connection fitting assembly employing three anchor supports of the invention.

In FIG. 11, three anchor supports of the invention, 10A, 10B, and 10C, are shown mounted within a 45° lateral branch connection fitting assembly for supporting an inner 45° lateral branch fitting 48 and inner pipes 38A–38D within an outer 45° lateral branch fitting 50 and outer pipes 44 (only two shown), and for anchoring the parts of the assembly relative to each other. As shown in FIG. 11, the inner pipe 38A is slidably received through the inner-component support 14 of the anchor support 10A and a carrier extension 52A, and in turn is received within a respective socket 54A of the inner branch fitting 48. Accordingly, the annular support surface 28 of the anchor support 10A abuts, or is stacked against one side of the carrier extension 52A, and the other side of the carrier extension is stacked against the outer face of the socket 54A. As can be seen, the carrier extension 52A defines a width dimensioned to fill any gap between the anchor support 10A and the socket 54A in order to permit the parts to abut one another and thereby anchor themselves in place. The carrier extension 52A is preferably a ring-shaped member which may be made, for example, by cutting or otherwise trimming a piece of piping to the desired width necessary to fill the gap between the anchor support and the adjacent carrier fitting. However, as will be recognized by those skilled in the pertinent art based on the teachings herein, the carrier extension may equally take any of numerous different shapes and/or configurations for purposes of performing its functions described herein.

As also shown in FIG. 11, the inner pipe 38B is slidably received through the inner-component support 14 of the anchor support 10B and a carrier extension 52B, and in turn is received within a respective socket 54B of the inner branch fitting 48. Accordingly, the annular support surface 28 of the anchor support 10B abuts, or is stacked against one side of the carrier extension 52B, and the other side of the carrier extension is stacked against the outer face of the socket 54B. As can be seen, the carrier extension 54B defines a width slightly greater than the width of the carrier extension 54A in order to fill the gap between the anchor support 110B and adjacent socket 54B and thereby permit the adjacent components to abut one another.

As also shown in FIG. 11, the anchor support 10C is inverted in the Figure relative to the other two anchor supports 10A and 10B in order to anchor and support the inner pipes 38C and 38D, and the corresponding outer pipe 44. The inner pipe 38C is slidably received on one end within the respective carrier branch socket 54C, and is slidably received on the other end through the inner-component support section 14 of the anchor support 10C and within one end of a standard pipe coupling 56. One end of the inner pipe 38D is slidably received within the other end of the pipe coupling 56 to form a stacked and anchored assembly. In addition, the outer-component support section 12 of the anchor support 10C is slidably received within the respective socket 58C of the outer branch fitting 50, and the corresponding outer pipe 44 is stacked against the annular surface on the other side of the outer-component support section to anchor the support and related parts in place.

If desired, rather than the anchor supports 10, the anchor supports 110 having pilots or like means may be used in the branch fitting assembly of FIG. 11 instead. In this case, the pilots 132 formed on the outer-component support section 114 (FIG. 4), or the pilots 132 formed on the tapered connecting section 116, are used to interlock the outer-component support section 112 to the containment socket 58C or the containment pipe 44.

Another advantage of the present invention is that a single type of anchor support can be used for each size combination of inner and outer pipes or other containment components (e.g., nominal 2 inch inside nominal 4 inch outside, nominal 3 inch inside nominal 6 inch outside, etc.). For each size combination, the outer-component support section of the anchor support corresponds to the respective outer pipe size, and the inner-component support section corresponds to the respective inner pipe size. Accordingly, in contrast to the prior art anchor supports, and as illustrated by the example of FIG. 11, each anchor support of the invention can be used for any arrangement involving its given size combination. Thus, a family of anchor supports of the invention, each corresponding to a respective inner/outer pipe size combination, can be provided to anchor and support virtually any double-containment piping assembly involving one of the standard size combinations. As also shown in the example of FIG. 11, the anchor supports of the invention may be combined with carrier and/or containment extensions, if required, in order to fill any gaps between the anchors and the adjacent carrier and/or containment components. Alternatively, if it is unnecessary to use standard, or "off-the-shelf" components, the axial length of the outer-component support section and/or the inner-component support section of an anchor can be selected to obviate the need for an extension ring or like extension coupling. In addition, as described above, the angle of taper of the connecting section of an anchor can be selected as desired in order to adjust the axial length of the connecting section for each given inner/outer pipe size combination, and therefore adjust the overall axial length of the anchor support.

Figure 12:
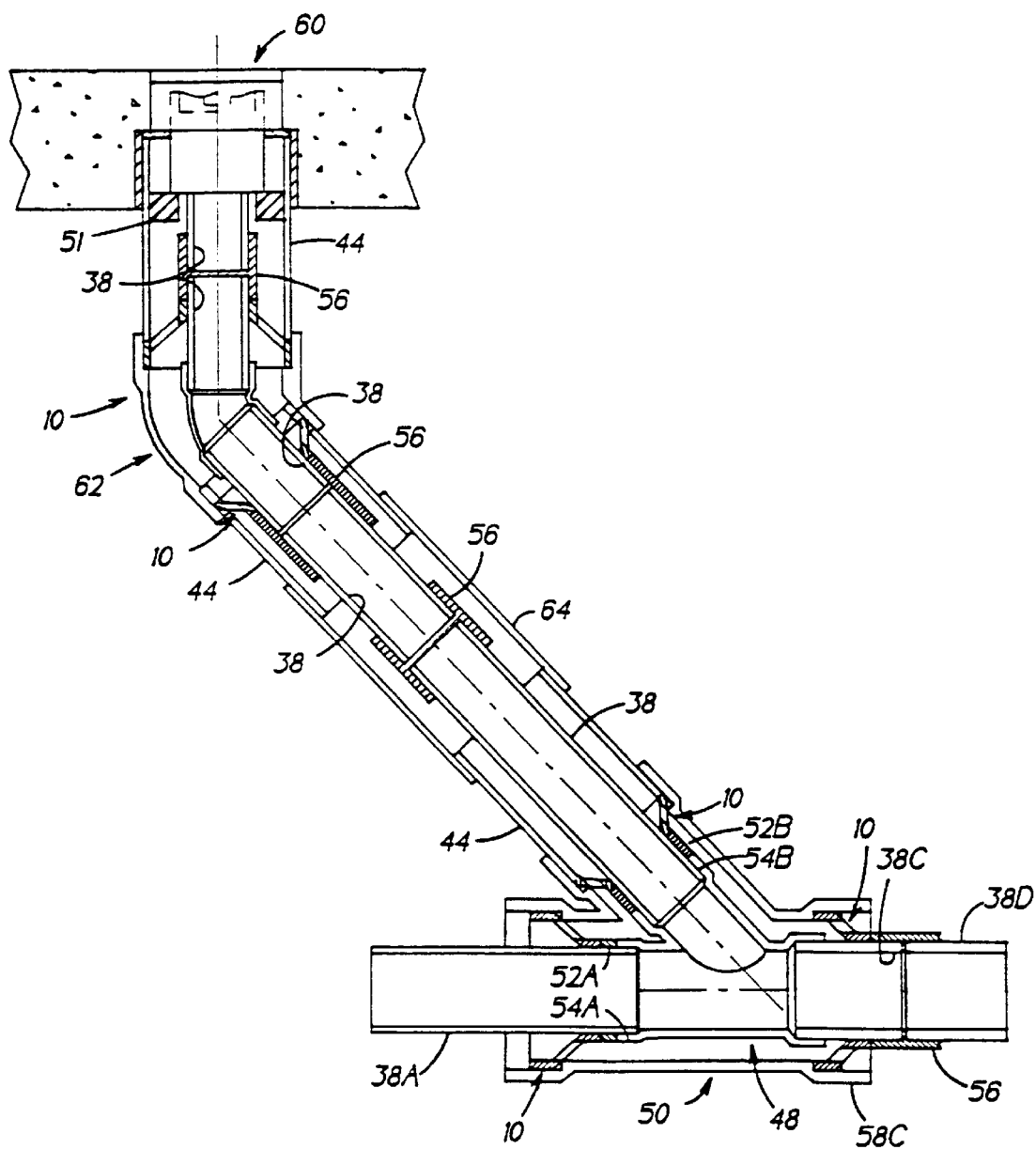
FIG. 12 is a cross-sectional view of a floor cleanout assembly employing the lateral branch connection fitting assembly of FIG. 11 and additional anchor supports of the invention.

In FIG. 12, the 45° lateral branch connection fitting and anchor assembly of FIG. 11 is shown assembled to a floor cleanout to create a mid-line cleanout assembly. As can be seen, a plurality of anchor supports 10, each identical to the others, are combined to anchor the entire assembly by slipping the components together and without having to fasten or otherwise join the other components to the anchors. In addition, each of the components of the assembly may be a standard, or "off-the-shelf" component.

As shown in FIG. 12, a floor cleanout assembly 60 is connected through a containment assembly, including two inner pipes 38 and a standard pipe coupling 56, to one end of a 45° elbow fitting 62. A corresponding straight containment pipe 44 is connected between the floor cleanout 60 and the 45° elbow 62, and an axial-guiding or centering support 51 is mounted between one of the inner pipes 38 and the containment pipe 44 to further support the inner and outer pipes in spaced relation to each other. As also shown, the 45° elbow fitting 62 includes anchor supports 10 or 110 of the invention mounted at each end of the fitting in the same manner as described above with reference to FIGS. 5–8 in order to anchor each of the components connected to the 45° elbow fitting relative to each other.

As also shown in FIG. 12, three inner pipes 38 are connected together with pipe couplings 56 between the anchor 10 at one end of the 45° elbow 62 and the corresponding anchor 10 of the 45° lateral branch fitting 48. Two straight sections of containment pipe 44 are each stacked against the same anchors, and a tubular closure fitting 64 is connected between the two straight sections of containment pipe 44 to enclose the assembly.

Turning to FIGS. 13A and 13B, two mid-line internal anchor assemblies incorporating the anchor supports 10, 110 of the invention are indicated generally by the reference numerals 66A and 66B, respectively. In FIG. 13A, the mid-line internal anchor assembly 66A comprises two anchor supports 10 or 110 of the invention, and the outer-containment component section 12, 112 of each anchor support is received within one end of a respective containment pipe coupling 68. Three straight sections of containment pipe 44 are received between, and within each end of the containment couplings 68 to thereby form a stacked and anchored containment assembly. Two straight sections of containment pipe 38 are each received through a respective inner-component support section 14, 114 of the anchor supports 10, 110, and in turn are each received within a respective end of the carrier pipe coupling 56 to form a stacked and anchored carrier assembly. In FIG. 13B, the midline internal anchor assembly 66B comprises one containment pipe coupling 68 with the outer-component support sections 12, 112 of each anchor support 10, 110 received within a respective end of the containment pipe coupling, and two carrier pipe couplings 56, each stacked against a respective inner-component support section 14, 114 of the anchor supports.

As can be seen, the anchor supports of the invention may be employed with other standard, or off-the-shelf components to easily and relatively inexpensively construct mid-line internal anchor assemblies. Mid-line internal anchor assemblies of this type are particularly suitable for use in internally flexible double-containment piping systems, and may be mounted, for example, between flexible fittings (i.e., fittings that permit axial and/or lateral movement of the inner piping components relative to the outer piping components) to anchor the inner piping components relative to the outer piping components. In these types of applications, the mid-line anchor assemblies are provided to limit, control and direct thermal expansion towards flexible elbow fittings, expansion loops, and like flexible fitting assemblies.

Figure 14:
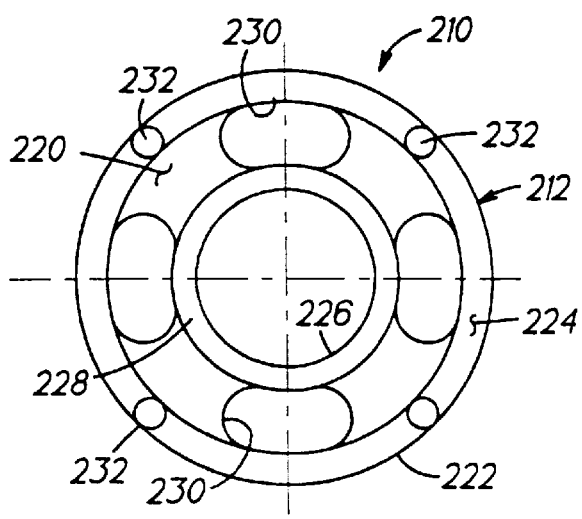
FIG. 14 is an end elevational view of another anchor support embodying the invention having a relatively thin, radially projecting outer-component support section and pilots or like means located thereon for interlocking the anchor support to an adjacent carrier component.
Figure 15:
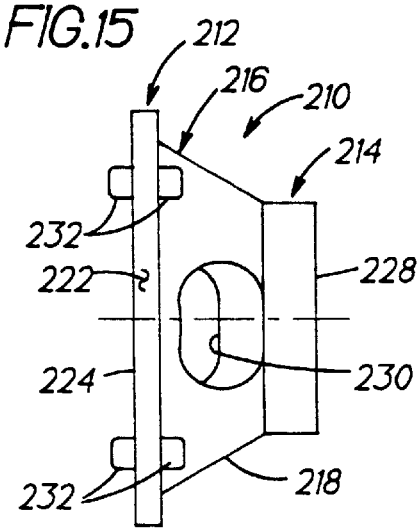
FIG. 15 is a side elevational view of the anchor support of FIG. 14.

In FIGS. 14 and 15, another embodiment of the anchor support of the invention is indicated generally by the reference numeral 210. The anchor support 210 is substantially the same as the anchor support 110 of FIGS. 3 and 4, and therefore like reference numerals preceded by the numeral "2" instead of the numeral "1" are used to indicate like elements. The primary difference of the anchor support 210 in comparison to those described above is that the axial lengths of the inner-component support section 214 and outer-component support section 212 are substantially less that of the corresponding sections described above. If necessary, carrier and/or containment extensions, such as extension rings, may be stacked against the ends of the inner and/or outer component support sections to provide suitable overall axial lengths. In addition, the annular surface 222 of the outer-component support section 212 is spaced radially outwardly from the adjacent end of the tapered connecting section 216 to, in effect, form a flange at the end of the support. This type of outer-component support section may be particularly suitable for mounting within the socket of a typical containment coupling of the type shown in the mid-line anchor assembly of FIG. 13.

Figure 16:
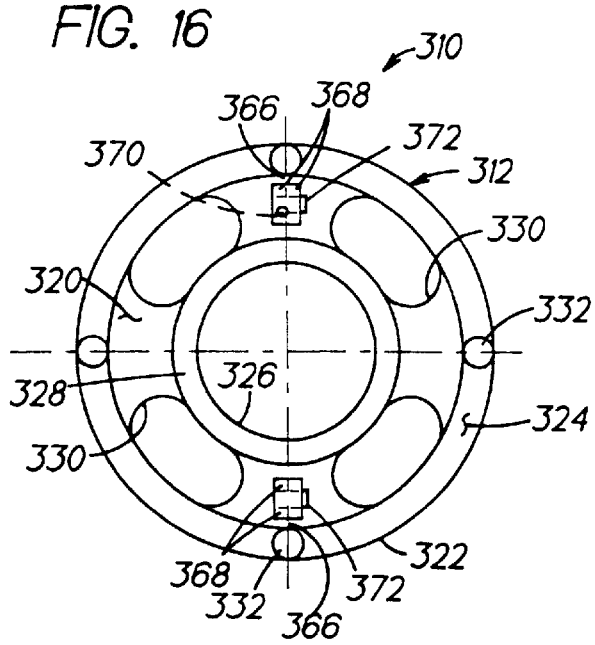
FIG. 16 is an end elevational view of another anchor support of the invention formed in two parts with means for joining the two parts together, and if desired, fixedly securing the anchor support to an inner pipe or like carrier component.
Figure 17:
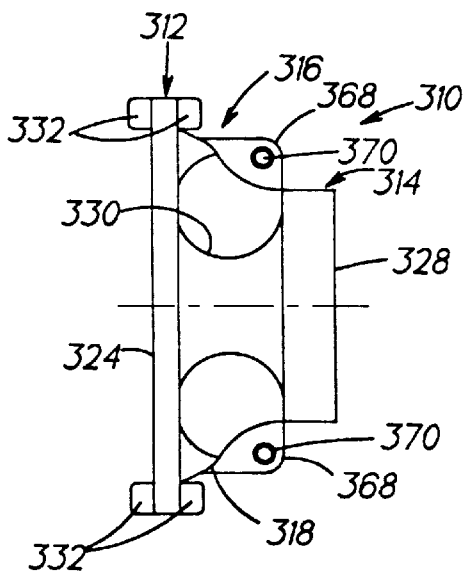
FIG. 17 is a side elevational view of the anchor support of FIG. 16.

In FIGS. 16 and 17 another anchor support embodying the invention is indicated generally by the reference numeral 310. The anchor support 310 is substantially the same as the anchor support 210 described above with reference to FIGS. 14 and 15, and therefore like reference numerals preceded by the numeral "3" instead of the numeral "2" are used to indicate like elements. The primary difference between the anchor support 310 and the anchor support 210 is that the anchor support 310 is a two-part support that may be connected together with bolts, screws or other suitable fasteners. As shown in FIG. 16, the anchor support 310 is split in half along a seam 366. Each half of the support defines two axially-extending joinder surfaces (each forming a respective seam 366), and further defines a respective half of the outer-component support section 312, inner-component support section 314, and tapered connecting section 316. As can be seen, the first and second parts of the support 310 are engageable along the opposing axially-extending joinder surfaces to join the first part to the second part and thereby form the anchor support. As shown in FIG. 16, two pairs of mating flanges or tabs 368 are formed on the inner tapered surfaces 320, and two pairs of mating flanges or tabs 368 are formed on the outer tapered surfaces 318 of each half of the support. As shown in FIGS. 16 and 17, each respective pair of opposing tabs 368 are aligned with each other, and depending upon the manner in which the anchor support is installed within a double-containment assembly, the inner tabs and/or the outer tabs may be connected together to join the two halves and thereby form an integral support. In the illustrated embodiment, each tab defines an aperture 370 extending through the tab for receiving a fastener 372 to fixedly secure the tabs, and thus the two halves of the support together. As will be recognized by those skilled in the pertinent art based on the teachings herein, however, any of numerous different means for joining the two halves of the anchor supports together may be employed. For example, any of numerous different fasteners may be employed. Alternatively, the two halves may be adhesively bonded, cemented, welded, or fused together.

One advantage of the two-piece anchor support 310 is that the anchor may be fixedly secured to the primary, carrier or inner pipe or component to prevent rotation of the parts relative to each other. Another advantage of this embodiment of the invention, is that if molded, the two-piece construction may reduce the size and cost of a fabricating mold in comparison to the mold required for forming the same type of anchor support as a single part.

As will be recognized by those skilled in the pertinent art based on the teachings herein, numerous changes and modifications may be made to the above-described and other embodiments of the invention without departing from its scope as defined in the appended claims. For example, the anchor supports of the invention can be used with virtually any type of inner and outer piping components in double-containment piping systems. As a further example, the anchor supports of the invention may be assembled with split outer piping components (i.e., two-part components) which may be assembled together to enclose the double-containment assembly by fasteners, electro-fusion, or other suitable joining mechanism. Exemplary closure fittings of this type suitable for use with the anchor supports of the invention for purposes of creating, for example, mid-line anchor assemblies in internally flexible double-containment piping systems, are shown in U.S. Pat. No. 5,690,148, which is hereby expressly incorporated by reference as part of the present disclosure.

The anchor supports of the invention also may take any of numerous different shapes and/or configurations. For example, the tapered connecting section may be defined by any of various surface configurations that gradually or otherwise decrease in diameter or width between, and in the direction from the outer-component support section toward the inner-component support section. Accordingly, it may be desirable to form the tapered connecting section with any of various taper angles, or to form the tapered surfaces with unique curvatures, ridges, or other linear or non-linear surface contours. One advantage of the substantially conical-tapered connecting sections of the preferred embodiments, however, are that they provide a relatively smooth transition of forces and stresses between the inner and outer-component support sections.

In addition, it may be desirable to form the inner-component support section and/or the outer-component support section in a different shape or configuration than those shown and described above. For example, the annular support surfaces may define a curvature different than a circular curvature if necessary to conform to a particular type of carrier or containment component. In addition, the inner-component and/or outer-component support sections may include flanges or other structures for facilitating assembly to other double-containment piping components. Accordingly, this detailed description of preferred embodiments is to be taken in an illustrative, as opposed to a limiting sense.

What is claimed is:

1. A double-containment pipe assembly comprising:

two outer piping components defining a first diameter;

two inner piping components received within the outer piping components and defining a second diameter less than the first diameter and forming an approximately annular space between the inner and outer piping components; and an anchor support comprising:

an outer-component support section including at least one first approximately annular support surface on at least one axial end thereof and defined at least in part by a first diameter approximately equal to the first diameter of the outer piping components;

an inner-component support section spaced laterally relative to, and located approximately at an opposite end of the anchor support relative to the outer-component support section, and including at least one second approximately annular support surface on at least one axial end thereof and defined at least in part by a second diameter which is less than the first diameter and approximately equal to the second diameter of the inner piping components; and a tapered connecting section defining a tapered surface extending between the outer-component support section and the inner-component support section and tapering from one end adjacent to the outer-component support section to another end adjacent to the inner-component support section;

wherein at least two of the approximately annular support surfaces abut at least two of the inner and outer piping components located on opposite sides of the anchor support relative to each other to thereby anchor and support at least one of the inner piping components within at least one of the outer piping components.

2. A double-containment pipe assembly as defined in claim 1, wherein the tapered connecting section tapers from approximately the first diameter at the end adjacent to the outer-component support section to approximately the second diameter at the other end adjacent to the inner-component support section.

3. A double-containment pipe assembly as defined in claim 1, wherein the first approximately annular support surface is defined by an end face of the outer-component support section and extends along a radial direction thereof.

4. A double-containment pipe assembly as defined in claim 1, wherein the outer-component support section defines an approximately cylindrical shape.

5. A double-containment pipe assembly as defined in claim 1, wherein the second approximately annular support surface is defined by an end face of the inner-component support section and extends along a radial direction thereof.

6. A double-containment pipe assembly as defined in claim 1, wherein the inner-component support section defines an approximately cylindrical shape.

7. A double-containment pipe assembly as defined in claim 1, wherein the tapered surface of the tapered connecting section is approximately conical shaped.

8. A double-containment pipe assembly as defined in claim 1, wherein the tapered surface of the tapered connecting section defines a taper angle of approximately 45° relative to an axis of the at least one anchor support.

9. A double-containment pipe assembly as defined in claim 1, wherein the tapered connecting section defines an external tapered surface and an internal tapered surface approximately parallel to the external tapered surface.

10. A double-containment pipe assembly as defined in claim 1, further comprising means for interlocking the anchor support with at least one of the inner and outer piping components.

11. A double-containment pipe assembly as defined in claim 1, further comprising an inner extension ring defined at least in part by the second diameter of the inner-component support section for abutting the inner-component support section.

12. A double-containment pipe assembly as defined in claim 1, further comprising an outer extension ring defined at least in part by the first diameter of the outer-component support section for abutting the outer-component support section.

13. A double-containment pipe assembly as defined in claim 1 comprising first and second anchor supports, and a mid-line anchor assembly including:
a first containment pipe coupling defining sockets on opposite ends thereof, wherein at least one outer-component support section of the first and second anchor supports is received within at least one socket thereof;
a first carrier pipe coupling defining sockets on opposite ends thereof;
at least one carrier piping component received through at least one inner-component support section of the first and second anchor supports, and received within at least one socket of the first carrier pipe coupling; and
at least one containment piping component received within at least one socket of the first containment pipe coupling.

14. A double-containment pipe assembly as defined in claim 13, further comprising:
a second carrier pipe coupling defining sockets on opposite ends thereof, wherein at least one inner piping component is received through the inner-component support sections of the first and second anchor supports, and within a socket of each of the first and second carrier pipe couplings, and the outer-component support sections of the first and second anchor supports are each received within a respective socket of the first containment pipe coupling.

15. A double-containment pipe assembly as defined in claim 13, further comprising:
a second containment pipe coupling defining sockets on opposite ends thereof, wherein the outer-component support section of the first anchor support is received within a socket of the first containment pipe coupling, the outer-component support section of the second anchor support is received within a socket of the second containment pipe coupling, and the at least one containment piping component is received within the other sockets of the first and second containment pipe couplings; and wherein
a first inner piping component is received through the inner-component support section of the first anchor support and within one socket of the first carrier pipe coupling; and
a second inner piping component is received through the inner-component support section of the second anchor support and within the other socket of the first carrier pipe coupling.

16. A double-containment pipe assembly as defined in claim 15, wherein the inner-component support section of the first anchor support abuts one end of the first carrier pipe coupling, and the inner-component support section of the second anchor support abuts the opposite end of the first carrier pipe coupling.

17. A double-containment pipe assembly as defined in claim 1, wherein the anchor support further comprises:
a first part defining at least one first axially-extending joinder surface, and further defining a portion of the outer-component support section, inner-component support section, and tapered connecting section; and
a second part defining at least one second axially-extending joinder surface, and further defining a portion of the outer-component support section, inner-component support section, and tapered connecting section, wherein the second part is engageable with the first part along the at least one axially-extending joinder surface to join the first part to the second part and thereby form the anchor support.

18. A double-containment pipe assembly as defined in claim 17, wherein the anchor support further comprises means for joining the first part to the second part.

19. A double-containment pipe assembly as defined in claim 18, wherein the means for joining includes at least one pair of flanges, wherein each flange in the pair is formed on a respective one of the first and second parts, and is aligned with the other flange in the pair for attaching the flange pair together to thereby attach the first and second parts.

20. A double-containment pipe assembly as defined in claim 1, wherein the tapered connecting section of the anchor support defines at least one aperture formed therethrough for permitting fluid flow through the support.

21. A double-containment pipe assembly as defined in claim 20, further comprising means for interlocking the at least one anchor support with at least one other double-containment piping component and positioning the aperture at a predetermined position with respect to the other double-containment piping component.

22. A double-containment pipe assembly as defined in claim 1, wherein an outer piping component abuttingly engages an annular support surface on one axial end of the anchor support, and an inner piping component abuttingly engages an annular support surface on an opposite axial end of the anchor support relative to the outer piping component.

23. A double-containment pipe assembly as defined in claim 1, wherein the outer component support section defines two first approximately annular support surfaces located on opposite axial ends of the outer component support section relative to each other, and each first annular support surface abuttingly engages a respective outer piping component.

24. A double-containment pipe assembly as defined in claim 1, wherein the inner component support section defines two second approximately annular support surfaces located on opposite axial ends of the inner component support section relative to each other, and each second annular support surface abuttingly engages a respective inner piping component.

25. A double-containment pipe assembly as defined in claim 1, wherein at least one of the outer piping components is an outer elbow fitting, and at least of the inner piping components is an inner elbow fitting, and at least one of the first and second annular support surfaces abuts at least one of the inner and outer elbow fittings.

26. A double-containment pipe assembly as defined in claim 25, wherein at least one of the first and second annular support surfaces abuts an end face of the respective inner or outer elbow fitting extending along a radial direction thereof.

27. An anchor support for a double-containment pipe assembly having at least one outer piping component defining a first diameter, and at least one inner piping component received within the at least one outer piping component and defining a second diameter less than the first diameter and forming an approximately annular space between the inner and outer piping components, the anchor support comprising:

an outer-component support section including a first approximately annular support surface defined at least in part by a first diameter approximately equal to the first diameter of the at least one outer piping component for supporting the outer piping component;

an inner-component support section spaced laterally relative to, and located approximately at an opposite end of the at least one anchor support relative to the outer-component support section, and including a second approximately annular support surface defined at least in part by a second diameter which is less than the first diameter and approximately equal to the second diameter of the inner piping component for anchoring and supporting the inner piping component within the outer piping component;

a tapered connecting section defining a tapered surface extending between the outer-component support section and the inner-component support section and tapering inwardly from one end adjacent to the outer-component support section to another end adjacent to the inner-component support section; and at least one protuberance projecting outwardly on one of the anchor support and the at least one inner or outer piping component, and at least one aperture shaped to receive the at least one protuberance formed on the other of the at least one anchor support and the at least one inner or outer piping component.

28. An anchor support as defined in claim 27, further comprising a plurality of protuberances radially spaced relative to each other on at least one of the anchor support and the inner or outer piping components.

29. A double-containment pipe assembly comprising:

two outer piping components defining a first width;

two inner piping components received within the outer piping components and defining a second width less than the first width and forming an approximately annular space between the inner and outer piping components; and an anchor support comprising:

first means for anchoring and supporting at least one of the outer piping components and including at least one first approximately annular support surface on at least one axial end thereof and defined at least in part by a first width approximately equal to the first width of the outer piping components;

second means for anchoring and supporting at least one of the inner piping components within the outer piping components, the second means being spaced laterally relative to, and located approximately at an opposite end of the at least one anchor support relative to the first means, and including at least one second approximately annular support surface on at least one axial end thereof and defined at least in part by a second width which is less than the first width and approximately equal to the second width of the inner piping components; and third means for connecting the first means to the second means, and including a tapered connecting section defining a tapered surface extending between the first means and the second means and tapering from one end adjacent to the first means to another end adjacent to the second means;

wherein at least two of the approximately annular support surfaces abut at least two of the inner and outer piping components located on opposite sides of the anchor support relative to each other to thereby anchor and support at least one of the inner piping components within at least one of the outer piping components.

30. A double-containment pipe assembly as defined in claim 29, wherein the tapered connecting section of the third means tapers from approximately a first diameter at the end adjacent to the first means to approximately a second diameter at the other end adjacent to the second means.

31. A double-containment pipe assembly as defined in claim 29, wherein the first annular support surface of the first means is approximately cylindrical.

32. A double-containment pipe assembly as defined in claim 29, wherein the first approximately annular support surface is defined by an end face of the first means and extends along a radial direction thereof.

33. A double-containment pipe assembly as defined in claim 29, wherein the second approximately annular support surface is defined by an end face of the second means and extends along a radial direction thereof.

34. A double-containment pipe assembly as defined in claim 29, wherein the second means defines an approximately cylindrical shape.

35. A double-containment pipe assembly as defined in claim 29, wherein the tapered surface of the third means is approximately conical shaped.

36. A double-containment pipe assembly as defined in claim 29, wherein an outer piping component abuttingly engages an annular support surface on one axial end of the anchor support, and an inner piping component abuttingly engages an annular support surface on an opposite axial end of the anchor support relative to the outer piping component.

* * * * *